United States Patent
Frank

(10) Patent No.: US 10,184,748 B2
(45) Date of Patent: Jan. 22, 2019

(54) CAMPER SHELL TURRET SYSTEM

(71) Applicant: Russell Frank, Sun Valley, ID (US)

(72) Inventor: Russell Frank, Sun Valley, ID (US)

(*) Notice: Subject to any disclaimer, the term of this patent is extended or adjusted under 35 U.S.C. 154(b) by 101 days.

(21) Appl. No.: 15/280,926

(22) Filed: Sep. 29, 2016

(65) Prior Publication Data

US 2017/0089660 A1 Mar. 30, 2017

Related U.S. Application Data

(60) Provisional application No. 62/234,582, filed on Sep. 29, 2015.

(51) Int. Cl.
| | | |
|---|---|---|
| *F41A 27/18* | (2006.01) | |
| *B60J 7/10* | (2006.01) | |
| *F41H 7/00* | (2006.01) | |
| *F41A 23/24* | (2006.01) | |

(52) U.S. Cl.
CPC ............ *F41A 27/18* (2013.01); *B60J 7/106* (2013.01); *F41A 23/24* (2013.01); *F41H 7/00* (2013.01)

(58) Field of Classification Search
CPC ... F41H 5/20; F41H 5/22; F41H 5/223; F41H 5/24; F41H 7/00; F41H 7/02; B64D 7/00; F41A 23/24; F41A 27/18; B60J 7/106
See application file for complete search history.

(56) References Cited

U.S. PATENT DOCUMENTS

| | | | | |
|---|---|---|---|---|
| 769,636 | A * | 9/1904 | Rausenberger | F41A 23/20 89/39 |
| 1,334,800 | A * | 3/1920 | Schneider | F41A 23/22 89/38 |
| 2,227,726 | A * | 1/1941 | Laddon | F41A 23/20 89/37.16 |
| 2,336,557 | A * | 12/1943 | McCallister | B64D 7/02 114/15 |

(Continued)

FOREIGN PATENT DOCUMENTS

| | | | |
|---|---|---|---|
| EP | 2071268 | 6/2009 | |
| EP | 2789963 | 10/2014 | |
| WO | WO-2014004254 A1 * | 1/2014 | F41H 5/223 |

OTHER PUBLICATIONS https://www.youtube.com/watch?v=C73EZOM0nrY May 12, 2009 (Year: 2009).*

(Continued)

*Primary Examiner* — Benjamin P Lee
(74) *Attorney, Agent, or Firm* — Intellectual Property Law Group LLP

(57) ABSTRACT

A collapsible turret apparatus used for shooting having a turret base and a turret ring. The turret base is mounted to a surface with an opening, such as a surface of a camper shell and the turret ring, which can rotate 360 degrees, is connected to a collapsible two part arm. In a collapsed state, the two part arm is folded and stowed on the ceiling of a camper shell. The first arm pivots about a point where it is connected to the turret ring. The second arm pivots about a point where (Continued)

it is connected to the first arm. In an extendable state, the two part arm reaches out of the camper shell. The available end of the two part arm has the ability to mount shooting devices, weapons and the like. Further accessories for the two part arm can be stored on the camper shell.

20 Claims, 3 Drawing Sheets

(56) References Cited

U.S. PATENT DOCUMENTS

| | | | | |
|---|---|---|---|---|
| 2,454,502 | A * | 11/1948 | Christian | F41A 27/18 89/37.17 |
| 4,336,743 | A * | 6/1982 | Horn | F41A 19/08 89/37.03 |
| 4,667,565 | A * | 5/1987 | Anderson | F41A 23/20 89/36.08 |
| 5,056,409 | A * | 10/1991 | Allais | F41A 23/20 89/37.01 |
| 6,302,010 | B1 * | 10/2001 | Holler | F41H 7/02 296/181.1 |
| 6,907,812 | B1 * | 6/2005 | Eckstedt | F41A 23/20 89/1.8 |
| 7,896,932 | B2 | 3/2011 | Ohnstad | |
| 8,418,708 | B2 | 4/2013 | Benish et al. | |
| 9,146,081 | B2 * | 9/2015 | Chu | F41H 5/013 |
| 9,328,986 | B1 * | 5/2016 | Pennau | F41A 23/20 |
| 2007/0000377 | A1 | 1/2007 | Ohnstad | |
| 2007/0119296 | A1 | 5/2007 | Niv et al. | |
| 2007/0251375 | A1 * | 11/2007 | Colburn | F41A 23/24 89/37.01 |
| 2010/0071540 | A1 | 3/2010 | Cazalieres et al. | |
| 2015/0267989 | A1 | 9/2015 | Hobson et al. | |

OTHER PUBLICATIONS https://www.youtube.com/watch?v=_j0eJ0xB7LU Apr. 30, 2011 (Year: 2011).*

International Search Report, dated Dec. 29, 2016, for corresponding International Application No. PCT/US2016/054536.

Written Opinion of the International Searching Authority, dated Dec. 29, 2016, for corresponding International Application No. PCT/US2016/054536.

* cited by examiner

CAMPER SHELL TURRET SYSTEM

CROSS-REFERENCE TO RELATED APPLICATION

This application claims the benefit of U.S. Provisional Application No. 62/234,582, filed Sep. 29, 2015, which is hereby incorporated by reference in its entirety.

BACKGROUND OF THE INVENTION

1. Field of the Invention

This invention relates to automobiles, more specifically to camper shells used for mounting sporting goods, shooting devices, or weapons on vehicles.

2. Background

Military vehicles or other specialized vehicles with turrets allow users to shoot weapons and facilitate transporting weapons from one location to another. Camper shells for commercial automobiles such as pickup trucks and coupe utility vehicles are used to protect cargo from the elements and from theft. Commercial camper shells are normally not armored with weapon mounting capabilities.

Pintle mount adapters that attach to two hitches or gooseneck and straight pipe mounts that attach to truck beds directly have been used to provide a mount for weapons. Such hard mounted system takes up cargo space because of the vertical mount that attaches to the truck bed. In the mini-gun carrying Suburban used by the United States Secret Service, the passenger space needs to be completely modified.

Tow hitch mounts permit only a limited arc of fire to the rear of a vehicle, such as a pickup truck. Dedicated armored vehicles have a much higher visual signature for law enforcement use. Turrets used on military vehicles are not available commercially for non-military vehicle like the average pickup truck. Users cannot mount sporting goods to commercial camper shells, so the user cannot utilize the camper shell as a shaded range bench rifle rest.

As such, there is a need for a camper shell, armored version or not, with the capability to mount accessories and shooting devices/weapons that is integrated into a camper shell and used on any commercially available average non-military vehicle, like a pickup truck so one does not need to purchase a specialized vehicle. There is also a need for the mount to not occupy truck bed space so users can utilize the space for other means. Further, there is a need to have a shaded range bench rifle rest anywhere with truck access so users can easily carry shooting devices, weapons and cargo.

SUMMARY

According to an embodiment of the present invention, there is a collapsible turret apparatus for shooting comprising: a turret base mounted to a surface around an opening on the surface; at least two pivotally connected arms, including: a first arm having a first end and a second end, the first end connected pivotally to a turret ring on the turret base, the turret ring rotating 360 degrees, a second arm having a first end and a second end, the second end of the first arm connected pivotally to the first end of the second arm; and a mounting means connected to a distal end of the second arm and configured to support a shooting device. In a stowed position under the surface, the second arm is collapsible against the first arm such that the second arm and first arm are parallel. In a deployed position, the first arm pivots approximately 270 degrees out from under the surface and through the opening, surrounded by the turret ring, to extend above the surface, and the second arm pivots approximately 270 degrees about the first arm. The first arm and second arm are reversibly retractable back to the stowed position.

In further embodiments, the mounting means is further configured to support an accessory or a weapon. In further embodiments, the first arm is approximately fifteen inches long and the second arm is approximately twelve inches long and is made of metal.

In further embodiments, the collapsible turret apparatus further comprises a gasketed hatch positioned on the base and covering the opening of the surface and there is a foldable canopy frame attached to the turret apparatus.

According to an embodiment of the present invention, there is a collapsible turret system for shooting comprising: a vehicle camper shell having an opening in a roof of the camper shell; a turret ring connected to a roof of the vehicle camper shell and surrounding the opening through the roof of the camper shell, the turret ring rotating 360 degrees; at least two pivotally connected arms; and a mounting means on one of the arms that is configured to support a weapon. The at least two pivotally connected arms include: a first arm having a first end and a second end, the first end connected pivotally to a turret ring; and a second arm having a first end and a second end; the second end of the first arm connected pivotally to the first end of the second arm, wherein the first arm and second arm are rotatable as a unit with the turret ring. In a stowed position, the second arm is collapsible against the first arm and in a deployed position, the first arm pivots approximately 270 degrees out from the camper shell and the second arm pivots approximately 270 degrees about the first arm. The first arm and second arm are retractable back to the stowed position inside the camper shell and is secured to the ceiling of the camper shell.

According to further embodiments, there is a gasketed hatch positioned on the base and covering the opening of the surface. According to further embodiments, there is a foldable canopy frame attached to the turret apparatus and positioned above the surface. According to embodiments, the camper shell is an aluminum material or a reinforced material, or a bullet proof material. According to further embodiments, there is a cotter pin for securing the first arm and second arm to the ceiling of the camper shell in a stowed position. According to embodiments, there is a bracket stowed accessories located on a surface of the camper shell. In further embodiments, there is a muzzle depression stop located on an exterior of the roof. According to embodiments, the camper shell is configured for a commercial vehicle. According to further embodiments, there are at least two arms that are made of aluminum or steel.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1A:
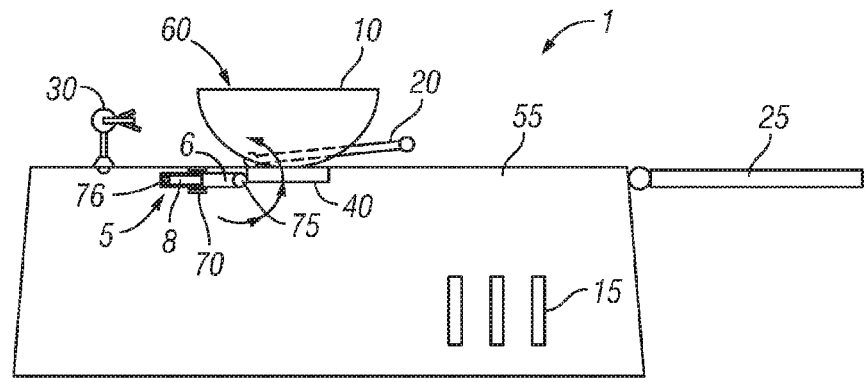
FIG. 1A illustrates a partial cross section of a side view of the turret system, showing a turret hatch door open with a movable two-part arm in a stowed position, according to an embodiment of the present invention.

As shown in FIG. 1A, there is a partial sectional side view of a collapsible turret system 1, showing half the turret 60 with gasketed turret hatch 10 open and the movable two-part arm 5 stowed on a surface such as the ceiling of a vehicle camper shell 55, according to an embodiment of the present invention. The turret 60 has a gasketed turret hatch 10 that protects cargo from water intrusion. The gasketed turret hatch 10 creates a watertight seal around the opening of the turret 60. The gasketed turret hatch 10, can be made of rubber or other polymeric materials. The turret 60 is substantially circular in shape. The gasketed turret hatch 10 includes substantially two symmetrical doors which can swing open and closed.

The movable two-part arm 5 is securely stowed to the ceiling of the camper shell 55 by a rotating connection point, such as a lock hinge 75 and can be permanently or temporarily attached to the turret ring 40 thus allowing the turret 60 to rotate 360 degrees. There is enough space in the truck bed for cargo when the movable two-part arm 5 is securely stowed or rotated up and out of the turret 60. The movable two-part arm 5 comprises a first arm 6 and second arm 8 connected by a lock hinge 76. At a distal end of the second arm 8 there is a mount 70 for attaching accessories and/or weapons and/or shooting devices. In one embodiment, the mount 70 is at least a .50 caliber sized pintle mount hole. In a stowed position, the second arm 8 which has a mount 70, folds and rests upon the first arm 6 of the movable two-part arm 5 when not in use. When in use, the movable two-part arm 5 rotates up and out of the turret 60. When the two-part arm 5 is up and out of the camper shell 55, it can be locked in place. Accessories can be fastened to the mount 70.

The turret 60 rotates 360 degrees by traversing the turret ring 40 and the turret ring 40 can be made of various types of metals, such as aluminum or steel. The collapsible turret system 1 has a muzzle depression stop 30 used for cab safety or for mounting auxiliary lights and is removably attached to the front of the camper shell 55, substantially close to the movable two-part arm 5. The muzzle depression stop 30 is mounted on the top exterior side of the camper shell 55 to prevent accidental discharge into the cab or body of the truck 80 and can be made of metals such as aluminum or steel. Hard points on various locations of the exterior side of the camper shell 55 allow attachment of extra gear.

The camper shell 55 has at least one ventilation slot 15 on at least one lateral side of the camper shell 55 and can be of any shape and size best for improved ventilation in the camper shell 55. The ventilation slot 15 can be screened. The rear door 25 of the camper shell 55 is attached to the camper shell 55 with a pivoting device and opens. The rear door 25 can be made of aluminum, reinforced fiberglass, steel or other protective materials.

The canopy frame 20 is removably attached to the interior portion of the turret 60 at the ceiling of the camper shell 55. The canopy frame 20 is a movable frame that can swing out and up from the opening of the turret 60 to provide shade or camouflage with a netting or canvas. When not in use, the canopy frame 20 can be detached from the turret 60, folded and stored inside the camper shell 55.

Figure 1B:
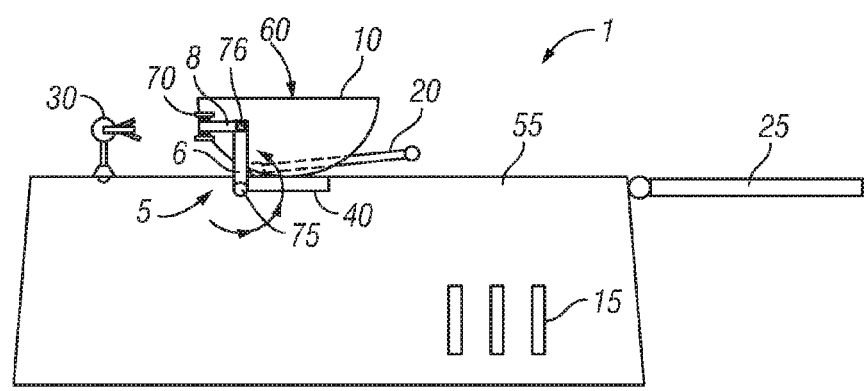
FIG. 1B illustrates yet another partial cross section of a side elevation view of the turret system as shown in FIG. 1A, showing a turret door open with the movable two-part arm rotated out and extended from the turret, according to an embodiment of the present invention.

As shown in FIG. 1B, there is a partial sectional side view of a collapsible turret system 1, showing half the turret 60 with gasketed turret hatch 10 open and the movable two-part arm 5 rotated out and extended from turret 60 on the ceiling of the camper shell 55 and ready for mounting, according to an embodiment of the present invention. The movable two-part arm 5 is removably connected to the turret ring 40 by the lock hinge 75. The lock hinge 75 connects the first part arm 6 to the turret ring 40. The lock hinge 76 connects the first part arm 6 to the second part arm 8. The two-part arm 5 can move in a rotating, pivoting or hinge-like fashion depending on the type of connection used to the turret ring 40. The connecting device of the movable two-part arm 5 to the turret ring 40 can be a hinge, bolt, or screw device. The connecting device between the first part arm 6 and second part arm 8 can also be a hinge, bolt, or screw device and the movement of the first part arm 6 and second part arm 8 can be in a rotating, pivoting, or hinge-like fashion depending on the structure of the lock hinge 76.

Figure 2:
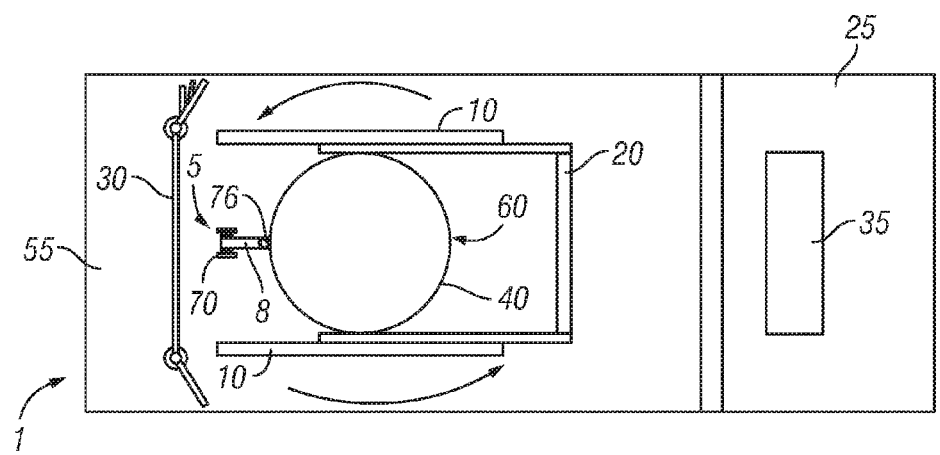
FIG. 2 illustrates a top plan view of the camper shell turret system with the turret doors open and movable arm in fully extended position, according to an embodiment of the present invention.

As shown in FIG. 2, there is an enlarged top view of a collapsible turret system 1, according to an embodiment of the invention, comprising gasketed turret hatch doors 10 that are open and connected to the turret 60 on parallel sides of the turret 60, for example, by means of hinges integrally connected to the turret ring 40. The canopy frame 20 swings up and out of the turret 60 and connected to the turret such that it rotates 360 degrees with the turret to provide camouflage or shade to the user. The rear door 25 of the camper shell 55 has at least one rear vision slit 35 and can be of various sizes and shapes. The rear vision slit 35 provides rear visibility from the driver's cab or for users inside the camper shell 55 to see outside. The glass of the rear vision slit 35 can be made of various materials such as bulletproof glass, regular automotive glass or Lexan.

The gasketed turret hatch 10 protects the user and cargo inside the camper shell 55 from damage by the elements. The camper shell 55 has at least one muzzle depression stop 30 removably attached to the top exterior side of the camper shell 55. When the doors of the gasketed turret hatch 10 are open, the movable two-part arm 5 having a second arm 8 connected to the first arm 6 (not shown, see FIG. 4C) by the lock hinge 76, swings up and out of the turret 60 and locks into place, thus allowing the user to fasten accessories to the mount 70. When the movable two-part arm 5 is not in use, the user rotates the mount 70 portion on the second part arm 8 of the movable two part arm 5 in the reverse direction and rotates the first part arm 6 of the movable two-part arm 5 back into the camper shell 55 so the mount 70 and second part arm 8 are nested in a folded position inside the camper shell 55. The movable two-part arm is stowed on the ceiling of the interior portion of the camper shell 55, secured and nested with a pin 65, such as a cotter pin.

Figure 3:
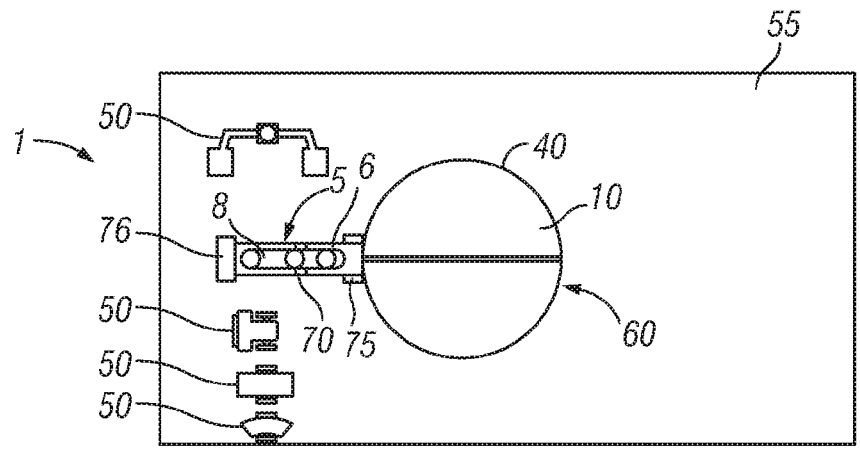
FIG. 3 illustrates a bottom plan view of the camper shell turret system with the turret doors close and movable arm in stowed position, according to an embodiment of the present invention.

As shown in FIG. 3, there is a collapsible turret system 1, according to an embodiment of an invention, comprising gasketed turret hatch 10, bracket stowed accessories 50, a movable two-part arm 5 and a mount 70. The gasketed turret hatch 10 is in a closed position and can be opened on either side by pushing either door of the gasketed turret hatch 10 up and outward. The turret ring 40 is engaged with the turret 60, allowing the turret 60 to rotate 360 degrees. The bracket stowed accessories 50 allows for attaching accessories such as an adjustable rifle rest for length of pull, .30 caliber pintle adapter, spotting scope mount adapter, or a 1913 rail cam lock adapter, and other like accessories. The camper shell 55 can be easily removed and attached from one truck to another.

Figure 4A:
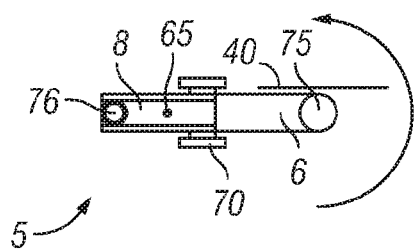
FIG. 4A illustrates a side elevation view of the movable two-part arm stowed inside of the shell, the mount is in a folded position and secured by a cotter pin to the ceiling, the movable two-part arm attached to the turret ring, according to an embodiment of the present invention.
Figure 4B:
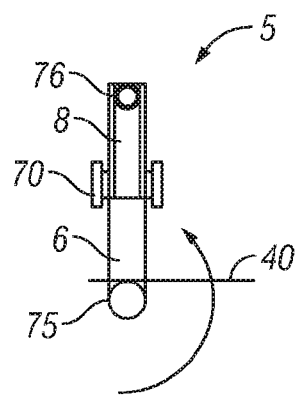
FIG. 4B illustrates another side elevation view of the movable two-part arm, rotated 270 degrees out of turret with the mount in a folded position, according to an embodiment of the present invention.
Figure 4C:
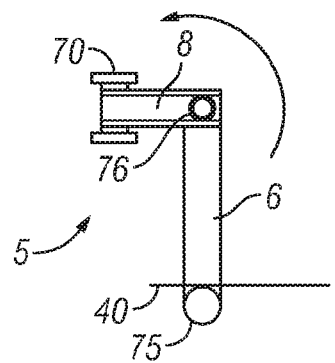
FIG. 4C illustrates yet another side elevation view of the movable two-part arm in a fully extended locked position, the mount arm extended out, according to an embodiment of the present invention.

FIGS. 4A-4C illustrate the collapsible movement of the movable arm 5 from a stowed position to a fully mountable position, according to an embodiment of the present invention. As shown in FIG. 4A, there is a side elevation view of a movable two-part arm 5 in a stored position at the ceiling of a camper shell. The movable arm 5, comprises a first part arm 6 connected to a second part arm 8 via a lock hinge 76, wherein the second part arm 8 comprises a mount 70 at a distal end and a pin hole for receiving a pin 65 for securing the arm 5 to the camper shell. The mount 70 is folded and rests inside/against the second part arm 8 of the movable two-part arm 5. The mount 70 can be a .50 caliber sized pintle mount hole and allows the user to mount varying accessories to the movable two-part arm 5. The movable two-part arm 5 can be temporarily or permanently attached to the turret ring 40 via a lock hinge 75, in order for the turret to rotate 360 degrees when the movable two-part arm 5 is extended outside of the turret 60. The movable two-part arm 5 can be made of various metals such as aluminum or steel. The first part arm 6 of the movable two-part arm 5 is connected to the turret ring 40 by a lock hinge 75. The user can manually swing the first part arm 6 of the movable two-part arm 270 degrees out of the turret 60, locking it in place as shown in FIG. 4B. The first part arm 6 can be approximately fifteen inches in length and the second part arm 8 can be approximately twelve inches in length. The first part arm 6 and the second part arm 8 can be approximately three inches in width.

As shown in FIG. 4B, there is a side elevation view of a movable two-part arm 5, according to an embodiment of an invention, where the movable two-part arm 5 is deployed from the interior of the turret 60 (not shown, see FIG. 1B) by rotating the movable two-part arm 5 270 degrees up and out of the turret 60 (not shown, see FIG. 1B). Only the first part arm 6 is in a deployed position as the second part arm 8 with mount 70 is still folded. The first part arm 6 is connected to the turret ring 40 by a lock hinge 75 and it is about this lock hinge 75 that the first part arm pivots. The second part arm 8 is connected to the first part arm 6 by a lock hinge 76 and it is about this lock hinge 76 that the second part arm 8 pivots.

As shown in FIG. 4C, there is a side elevation view of a fully extended movable two-part arm 5, according to an embodiment of an invention. The first part arm 6 is connected to the turret ring 40 via a lock hinge 75. The second part arm 8 with mount 70 is rotated 270 degrees from the position depicted in FIG. 4B about the lock hinge 76. It is in this position that the movable two-part arm 5 is locked in place and ready for use. The shooting device, weapon or accessories can be secured to the mount 70.

Figure 5:
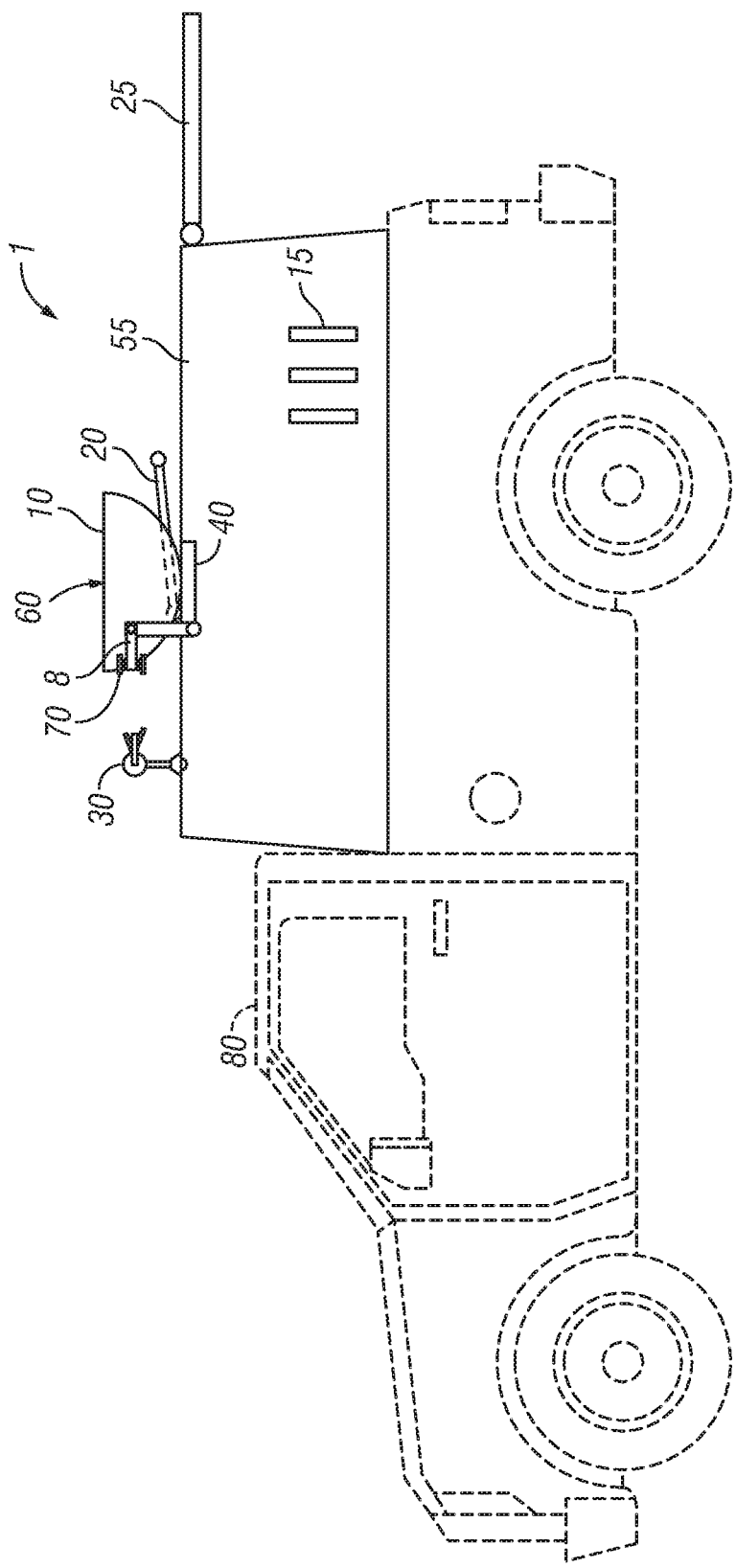
FIG. 5 illustrates a side elevation view of the camper shell turret system installed on a pickup truck, showing the turret in partial cross section, according to an embodiment of the present invention.

As shown in FIG. 5, there is a side elevation view of a camper shell turret system 1, securely attached to the bed of a pickup truck 80, showing a partial cross section through the turret 60, according to an embodiment of an invention. Essentially half of the gasketed turret hatch 10 and canopy frame 20 is shown, i.e. one of the turret doors in open position, where the other half of the turret gasket and canopy frame are not shown. The camper shell turret system 1 comprises standard bed dimensions and fits onto an average pickup truck 80, for example by means of industry standard brackets.

The previously described embodiments of the invention have many advantages, such as the ability to mount shooting devices, weapons and accessories on the mount 70 portion of the movable two-part arm 5 without taking up space in the camper shell 55. The camper shell turret system 1 is integrated into the camper shell 55 making it possible for the camper shell turret system 1 to be used among any commercial truck 80. The invention does not require all the advantageous features and all advantages to be incorporated into every embodiment of the invention.

An unarmored embodiment of the present invention can be made of materials such as aluminum or reinforced fiberglass and can be used for casual users for recreational shooting. An armored embodiment of the present invention can be made of material that is bullet proof as mentioned above and made for law enforcement or military usage.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A collapsible turret apparatus for shooting comprising:
    a turret base mounted to a surface around an opening on the surface;
    at least two pivotally connected arms, including:
        a first arm having a first end and a second end, the first end connected pivotally to a turret ring on the turret base, the turret ring rotating 360 degrees,
        a second arm having a first end and a second end, the second end of the first arm connected pivotally to the first end of the second arm, in a stowed position under the surface, the second arm is collapsible against the first arm such that the second arm and first arm are parallel; and in a deployed position, the first arm pivots approximately 270 degrees out from under the surface and through the opening, surrounded by the turret ring, to extend above the surface, the second arm collapsed against the first arm until the second arm pivots approximately 270 degrees about the first arm; the first arm and second arm are reversibly retractable back to the stowed position; and a mounting means connected to a distal end of the second arm and configured to support a shooting device.

2. The apparatus of claim 1, wherein the mounting means is further configured to support an accessory.

3. The apparatus of claim 1, wherein the first arm is approximately fifteen inches long.

4. The apparatus of claim 1, wherein the second arm is approximately twelve inches long.

5. The apparatus of claim 1, wherein the shooting device supported by the mounting means is a weapon.

6. The apparatus of claim 1, wherein the at least two arms are made of a metal.

7. The apparatus of claim 1, further comprising a gasketed hatch positioned on the turret base and covering the opening of the surface.

8. The apparatus of claim 1, further comprising a foldable canopy frame attached to the turret apparatus and positioned above the surface.

9. A collapsible turret system for shooting comprising:
a truck camper shell removably attached to a truck having an opening in a roof of the truck camper shell;
a turret ring connected to the roof of the truck camper shell and surrounding the opening through the roof of the truck camper shell, the turret ring rotating 360 degrees;
at least two arms, including:
a first arm having a first end and a second end, the first end connected pivotally to a turret ring,
a second arm having a first end and a second end, the second end of the first arm connected pivotally to the first end of the second arm, wherein the first arm and second arm are rotatable as a unit with the turret ring;

in a stowed position, the second arm is collapsible against the first arm and in a deployed position, the first arm pivots approximately 270 degrees out from the truck camper shell and the second arm pivots approximately 270 degrees about the first arm; the first arm and second arm are retractable back to the stowed position inside the truck camper shell and is secured to a ceiling of the truck camper shell; and a mounting means connected to the second end of the second arm, the mounting means configured to support a weapon.

10. The collapsible turret system of claim 9, further comprising a gasketed hatch positioned on the turret ring and covering the opening of the roof.

11. The collapsible turret system of claim 9, further comprising a foldable canopy frame positioned above the roof.

12. The collapsible turret system of claim 9, wherein the truck camper shell is made of an aluminum material.

13. The collapsible turret system of claim 9, wherein the truck camper shell is made of a reinforced fiberglass material.

14. The collapsible turret system of claim 9, wherein the truck camper shell is made of a bullet proof material.

15. The collapsible turret system of claim 9, further comprising a cotter pin for securing the first arm and second arm to the ceiling of the truck camper shell in a stowed position.

16. The collapsible turret system of claim 9, further comprising bracket stowed accessories located on a surface of the truck camper shell.

17. The collapsible turret system of claim 9, further comprising a muzzle depression stop located on an exterior of the roof.

18. The collapsible turret system of claim 9, wherein the truck camper shell is configured for a commercial vehicle.

19. The collapsible turret system of claim 9, wherein the at least two arms are made of aluminum.

20. The collapsible turret system of claim 9, wherein the at least two arms are made of steel.

* * * * *